D. A. JACKSON.
GAME APPARATUS.
APPLICATION FILED JULY 24, 1908.
934,179.
Patented Sept. 14, 1909.
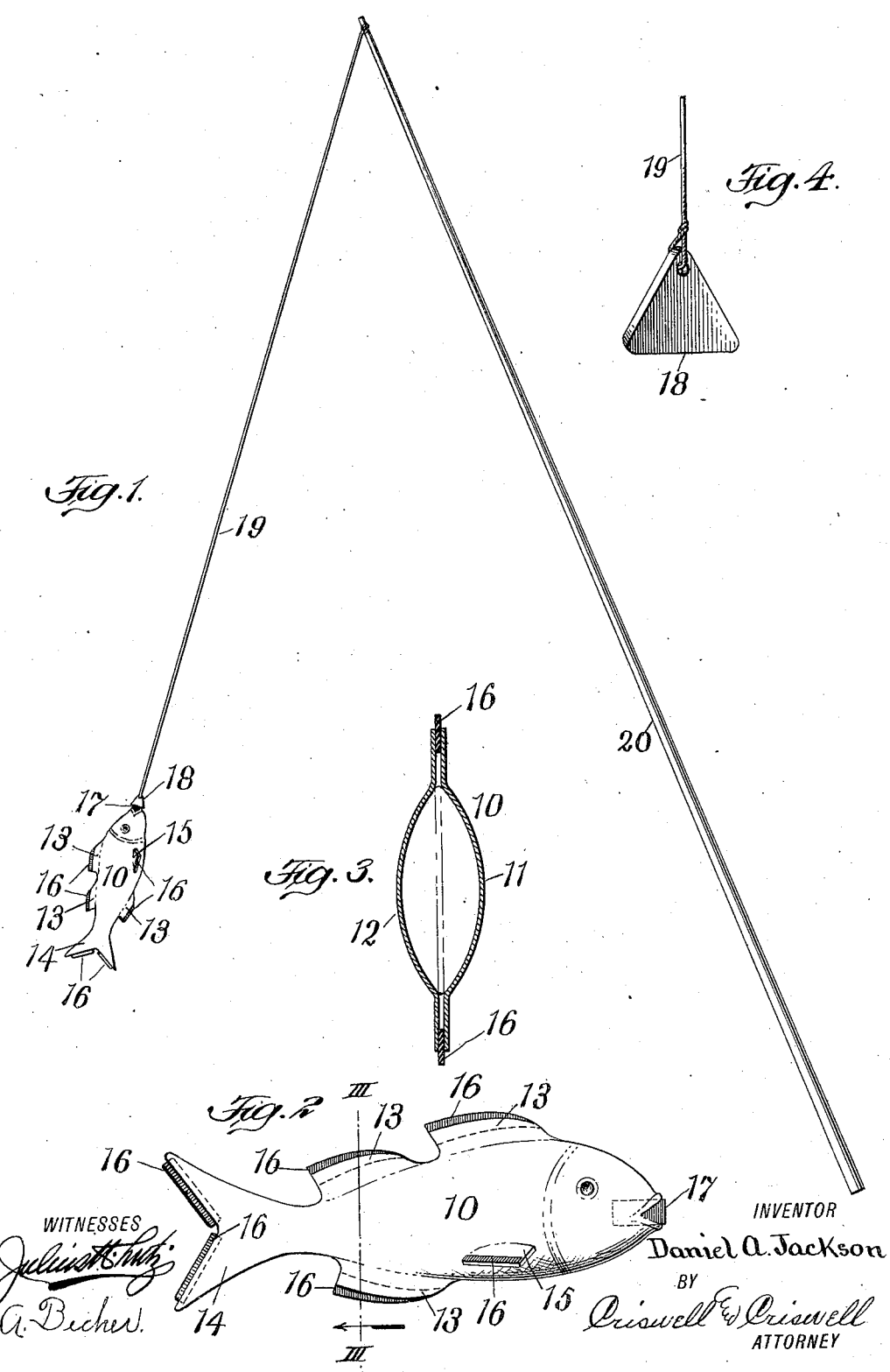
WITNESSES
Julius H Fritz
A. Becher.
INVENTOR
Daniel A. Jackson
BY
Criswell & Criswell
ATTORNEY

UNITED STATES PATENT OFFICE.

DANIEL A. JACKSON, OF NEW YORK, N. Y.

GAME APPARATUS.

934,179.

Specification of Letters Patent. Patented Sept. 14, 1909.

Application filed July 24, 1908. Serial No. 445,192.

*To all whom it may concern:*

Be it known that I, DANIEL A. JACKSON, a citizen of the United States, and a resident of New York, borough of Brooklyn, county of Kings, and State of New York, have invented certain new and useful Improvements in Game Apparatus, of which the following is a full, clear, and exact description.

This invention relates more particularly to a game apparatus in which simulated fish form a part thereof.

The primary object of the invention is to provide an interesting game in which simulated fish or like objects may be arranged in a tank or otherwise, and which have a plurality of magnets of different attractive strength carried thereby which are adapted to be engaged or attracted by a magnet or device carried on the end of a line in such a way that the magnet on the line will be permitted to engage and attract the objects by any one of the magnets carried thereby, but is required to engage a particular one before the object can be raised out of the water, or wherever placed, thus materially increasing the difficulty of removing the object and effecting the result sought to be accomplished by the game.

A further object of the invention is to provide a simple game apparatus in which hollow simulated fish may be placed in a tank and adapted to float therein, or be made so as to readily rise to the surface of the water, but which requires an object to engage the fish at a certain place before the simulated fish can be removed from the water.

With these and other objects in view, the invention will be hereinafter more particularly described with reference to the accompanying drawings, which form a part of this specification, and will then be pointed out in the claims at the end of the description.

In the drawings, Figure 1 is an elevation of one form of apparatus embodying my invention. Fig. 2 is a detail elevation of one of the objects. Fig. 3 is a transverse section taken on the line III—III of Fig. 2; and Fig. 4 is a detail view of a magnet or device by which the object to be removed may be engaged.

A number of simulated fish 10 or other objects may be employed in carrying out my invention, and when the objects are made to represent fish, I may place a number of the same within a tank containing water so that the objects may float on the surface of the water or rest upon the bottom of the tank as desired. As shown each object 10 is in the form of a fish, and each object may be hollow by forming two opposed sides 11 and 12 and joining them together in the usual manner so as to more nearly conform to the shape of the object which is represented. The simulated fish 10 has its fins 13 and tail 14 as usual as well as the gill fins 15, and formed as a part thereof or attached thereto are the elements 16 which may be pieces of steel, or magnets suitably held between the two parts of the body portion so as to project beyond the outer edge thereof. A steel mouthpiece 17 or other device is arranged in the mouth of the object, and this device 17 when a magnet is much stronger than either of the magnets 16 arranged on the other parts of the body of the object, and each magnet or device is adapted to be attracted by a magnet 18 arranged on the end of a line 19, and this line may be carried or held to a pole 20. The magnet 18 may be triangular or of any other suitable form to make it more or less difficult to engage the magnets of the object for its removal from a tank or to be otherwise removed. It will be seen that when the magnet 18 is made to move adjacent to the simulated fish it is as likely to come in contact with any one of the magnets 16 as with the magnet 17. The magnets 16 are of such strength that they will permit the object, if a fish, to be raised to the surface of the water, or to be moved somewhat if not located in a tank, but the attraction is not sufficiently strong between the device 18 and said magnets or devices 16 as to entirely raise the object or permit the simulated fish to be caught. This can only be done through the mouthpiece or magnet 17 which is stronger than the magnet 16, and of such a nature that the attraction between the said device 16 and the magnet or device 18 will cause the object to be entirely removed from the tank. Unless the device 18 engages the device 17 the object will remain in the water or fall to the bottom again after being once raised making it more difficult to properly catch the simulated fish.

Instead of having each simulated fish or other object provided with a device 17, only one or a plurality of the same may be provided with such a device thereby requiring not only the particular object to be caught, but also to be caught in a particular way, the other magnets or devices serving to keep the magnet 18 on the line from engaging the proper magnet of the object.

From the foregoing it will be seen that simple and efficient means are provided whereby one or more objects having a plurality of magnets of different strengths may be arranged in a tank or otherwise, and which are adapted to be removed by means of an independent magnet or device; that said devices may be made to represent fish or other objects, and that the game apparatus will be more interesting than the usual form of game.

Having thus described my invention, I claim as new and desire to secure by Letters Patent:—

1. A game apparatus having simulated fish provided with a plurality of magnets of varying strength, and an independent magnet adapted to engage the magnets carried by the simulated fish.

2. A game apparatus having an object provided with a plurality of magnets of different strengths, and an independent magnet adapted to engage the magnets carried by the object.

3. A game apparatus having an object provided with a plurality of magnet elements, and an independent magnetic element adapted to engage the elements carried by the object.

4. In a game apparatus, an object having a plurality of magnets of different strengths forming a part thereof, and a device adapted to be attracted by said magnets.

5. In a game apparatus, a simulated fish having a plurality of magnets of different strengths forming a part thereof, and a device adapted to be attracted by said magnets.

6. In a game apparatus, an object having a plurality of magnets one of which is located in its mouth and the others of different strength therefrom located at different parts of the body of said object, and a device adapted to be attracted by said magnets.

7. A game apparatus, comprising a plurality of simulated fish each having a plurality of magnets of different strengths located on different parts of the body thereof, a device adapted to be attracted by the magnets of the object, and supporting means for the device.

8. A game apparatus, comprising a plurality of objects each of said objects having a plurality of magnetic elements, a device adapted to be attracted by the elements of the objects, and supporting means for the device.

9. A game apparatus, comprising a plurality of simulated fish each having a plurality of magnets of different strengths located on different parts of the body and a magnet in the mouth thereof, a magnet adapted to be attracted by the magnets of the object, and supporting means for the last-mentioned magnet.

10. A game apparatus, comprising a plurality of simulated fish each having a plurality of magnets of different strengths located in the mouth, tail and fin portions of the body, and a magnet adapted to engage the magnets of the objects for the purpose set forth.

This specification signed and witnessed this twenty-third day of July A. D. 1908.

DANIEL A. JACKSON.

Witnesses:
M. TURNER,
A. BECKER.